Sept. 14, 1965      I. DRITZ      3,205,890
CUFF FOR TUBULAR ELEMENTS
Filed Sept. 24, 1962
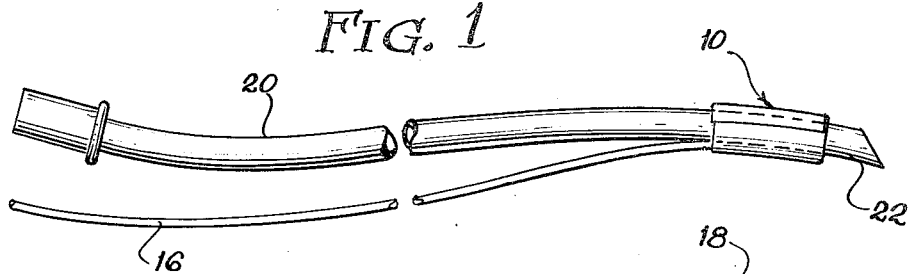
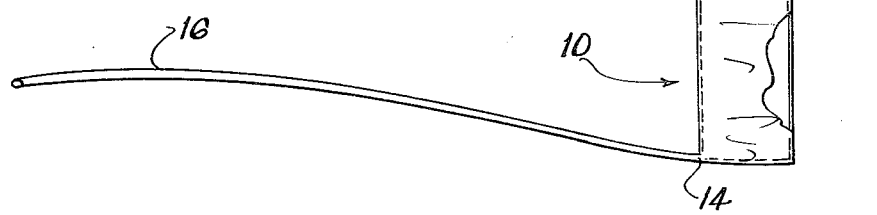
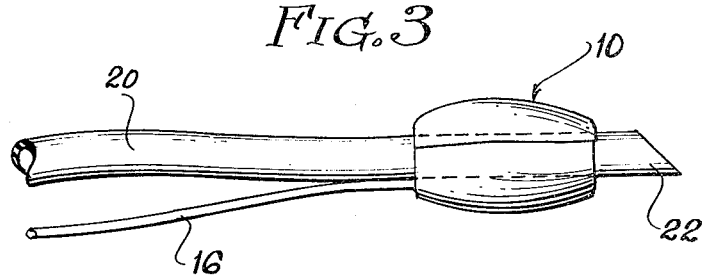
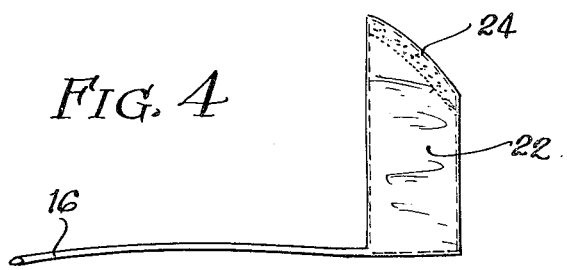
INVENTOR.
Irwin Dritz
BY
Ooms, McDougall and Hersh
Att'ys

United States Patent Office

3,205,890
Patented Sept. 14, 1965

3,205,890
CUFF FOR TUBULAR ELEMENTS
Irwin Dritz, 2956 W. Bryn Mawr Ave., Chicago 45, Ill.
Filed Sept. 24, 1962, Ser. No. 225,790
2 Claims. (Cl. 128—351)

The present invention relates to a cuff which is adapted to be fitted around a tube which is employed for passing fluids into the body. In one primary application of this invention, the novel cuff is employed in combination with an endotracheal tube whereby anesthetics may be administered through the trachea.

In the administering of anesthetics or other fluids into the body, it has, in many cases, been found necessary or advisable to provide means for effecting a seal between the external wall of the tube passing the fluid, and the internal wall of the trachea or other organ into which the tube is inserted. The success of an operation may depend on such means, however, even where not absolutely necessary, these means increase the efficiency of the technique.

The prior art has previously designed cuffs, principally endotracheal cuffs, which comprise an inflatable balloon adapted to be fitted around the end of a tube. Means communicate with the cuff whereby it can be inflated after the tube has been inserted into the body. In the case of an endotracheal tube, the inflated cuff serves to provide a seal between the external surface of the tube and the internal surface of the trachea.

Cuffs of the nature described have been found to be extremely necessary under certain circumstances during the administering of anesthetic through the trachea. Thus, if a cuff for providing a seal were not provided in an effective manner, undesirable foreign particles or gases could pass through a patient's trachea around the outside of the endotracheal tube. Obviously, the effectiveness of the anesthetic administered would be severely hampered in the event of introduction of foreign particles or gases, and fatal termination for the patient could result. It is also apparent that the prevention of leakage of anesthetic gases or vapors allows a more constant and accurately controlled concentration of these to be used, thereby allowing more precise physiological control of the patient. The avoiding of waste by leakage of these gases or vapors will, in addition, result in an economic savings since less anesthetic will be used.

In the past, endotracheal cuffs have been designed in the form of tubular members which have an internal diameter in excess of the external diameter of an endotracheal tube whereby the cuff can be fitted over the end of the tube prior to insertion and inflation. Such tubular cuffs have proven difficult to handle since in many cases, the dimensions thereof have not corresponded in a consistent manner to the dimensions of the endotracheal tubes. If the cuffs were slightly undersize or the tube oversize, difficulty in passing around the tube is experienced. If the cuff is slightly oversize or the tube undersize, difficulty in applying the cuff and in maintaining the cuff in the desired location on the tube is experienced. Mechanisms have been devised for applying such tubular cuffs; however, use of these requires additional time and expense and therefore they are considered unsatisfactory.

The tubular construction of prior art cuffs has also represented a relatively expensive design. For this reason it has been the practice of the art to employ such cuffs for more than a single operation, and, therefore, it has been necessary to sterilize the cuffs after each use. Understandably, such a procedure materially increases the expense associated with the use of such cuffs.

It will be appreciated when considering the above comments that the nature of the conventional cuff leads to many unsatisfactory situations. In addition to the expense of manufacture, the complexity thereof can result in inoperative cuffs which of course cannot be used at all. Furthermore, even where correctly made initially, the repeated use, cleaning and sterilization of such cuffs reduces the reliability for subsequent uses and the number of times such may be used therefore varies considerably.

It is a general object of this invention to provide an improved cuff for use in combination with tubes employed for introducing fluids into the body.

It is a more particular object of this invention to provide cuffs, particularly endotracheal cuffs, which overcome the difficulties experienced with prior art cuffs for the reason that the cuffs of this invention are easily applied to tubular members, and for the reason that sterilization of the cuffs does not represent a significant problem.

It is a further object of this invention to provide an endotracheal cuff which can be employed despite dimensional variations in endotracheal tubes and which is of an economical and simple construction whereby the cuffs can be disposed of after a single use thereby eliminating sterilization problems.

It is a further object of this invention to provide a cuff of the type described which can be manufactured in a highly simple manner, which can be easily tested for air leakage, and which is adapted to be easily and economically packaged under sterile conditions.

These and other objects of this invention will appear hereinafter, and for purposes of illustration but not of limitation, specific embodiments of this invention are shown in the accompanying drawings in which:

FIGURE 1 is an elevational view illustrating the provision of an endotracheal cuff in operating position around the end of an endotracheal tube;

FIGURE 2 is an elevational view illustrating the cuff construction of this invention;

FIGURE 3 is an enlarged elevational view illustrating an endotracheal cuff in the distended state when positioned about the end of an endotrachea tube; and FIGURE 4 is an elevational view illustrating an alternative cuff construction.

The cuff construction of this invention departs from previous constructions primarily due to the fact that it comprises an envelope which is adapted to be laid out in a generally planar fashion. This envelope is sealed in a fluid-tight manner about its edges and is provided with an opening in one of the edges with a fluid conduit communicating with this opening.

Fastening means are provided on the envelope so that the envelope can be wrapped around a tube and held in this position by the fastening means. When the tube with the cuff provided thereon is inserted into the trachea or other portion of the body, the cuff will be held in position to provide the desired seal. The seal is effected by introducing air or other fluid into the envelope through the conduit whereby the envelope will expand to press against the external wall of the tube and the internal wall of the trachea.

In accordance with a preferred form of this invention, the envelope comprises an elongated generally rectangular member. The long dimension of the envelope exceeds the diameter of the tube with which it is to be associated so that it can be wrapped around the tube in the manner described. A pressure sensitive adhesive preferably comprises the fastening means for the envelope whereby the envelope can be conveniently and effectively positioned by pressing the adhesive coated end onto an underlying envelope portion.

The envelope itself is preferably inflated through the associated conduit by introducing air into its interior. Accordingly, the envelope must be sealed in an air-tight manner about its edges. This invention permits a highly effective manner of providing such a sealed envelope since the materials for forming it can be positioned in a generally planar fashion during manufacture. Thus, with this design, flat sheets of a heat sealable material can be employed and these can be easily closed off about their edges in a rapid and highly efficient manufacturing process. Polyethylene is considered to be a suitable material particularly due to the heat sealing characteristics thereof, and because it is relatively inexpensive. Polyethylene cuffs can be disposed of after a single use, and such disposal will in fact prove more economical in terms of unit cost, maintenance, storage, etc., than prior attempts to use the cuffs for more than one operation. It will be appreciated that applicant does not limit the invention to any particular material and that materials such as rubber, latex, and various materials which are easily distensible and capable of being inflated are contemplated.

The accompanying drawings illustrate a cuff 10 which comprises an envelope portion 12 sealed about its edges. An opening 14 defined by the envelope communicates with a conduit 16 which is adapted to introduce air or other fluid into the envelope. In the illustrated cuff, a pressure sensitive adhesive portion 18 is located at the end opposite the opening 14 whereby the cuff can be fastened around a tubular member.

FIGURE 1 illustrates an endotracheal tube 20 having a distal end 22. The cuff 10 is shown wrapped around the end 22 and it will be apparent that the overlapping end of the cuff having the pressure sensitive adhesive 18 can be pressed into adhering relationship with the underlying cuff surface to firmly secure the cuff in position on the tube 20.

FIGURE 3 illustrates the cuff 10 after the introduction of air through the conduit 16. As previously explained, expansion of the cuff in the manner shown results in the provision of a seal between the external wall of the tube 20 and the internal wall of the trachea. With the tube 20 and associated cuff in position within the trachea and with the cuff expanded in the manner shown, the introduction of foreign material or gases around the outside of the tube 20 can be effectively avoided.

In FIGURE 4 there is illustrated a modified cuff 22 which is provided with a top edge 24 which defines a taper. In the use of the cuff illustrated, the endotracheal tube is placed adjacent the conduit 16 and the cuff is wrapped around the tube so that the tapered end is the last portion to be placed in position. The taper comprises a valuable modification since there is thereby avoided the danger of plugging the outlet of the endotracheal tube with an overhanging portion of the cuff. Thus, in some instances where the cuff is disposed too near the outlet end of the tube, it is possible that a portion of the cuff could extend over the outlet end and plug up this end when the cuff is expanded. By providing a tapered end in the manner shown, this danger is obviated.

It is also contemplated that adhesive be provided on portions of the cuff other than at the overlapping end. Thus, the provision of adhesive at intermediate points on the cuff will permit the cuff to adhere directly to the surface of the tube as it is placed there around. This feature is particularly valuable where a relatively stiff material is employed for the cuff since the intermediate adhesive portions will hold the cuff in position on the tube during the initial stages of the wrapping operation.

It will be appreciated that the cuff construction described provides many advantages over a cuff of tubular construction. Since the dimensions of the envelope portion of the cuff are such that the cuff can be wrapped around a tube and overlap, there is no critical dimension problem. Any small variations in the diameter of an endotracheal tube or in the length in the envelope portion can be easily accommodated without departing from the ease of use and effectiveness of the cuff.

Due to the design of the envelope portion, the cuff of this invention can be subjected to highly economical manufacturing procedures. Furthermore, the use of inexpensive materials is made possible by this invention, and, therefore, the unit cost of the cuff will be substantially less than the cost of cuffs presently in use. Under such conditions, the cuffs can be economically disposed of after a single use, and, therefore, sterilizing operations with respect to the cuffs are eliminated.

The cuffs of this invention present an additional clear advantage due to the fact that they can be easily and rapidly applied. Thus, a decision can be made to use the cuffs at the last minute and there will be no significant delay in the operating schedule. Understandably, this feature also proves desirable in emergency situations.

Due to the planar nature of the cuffs prior to use, a greatly simplified packaging procedure is possible since a large number of the cuffs can be packaged in relatively small containers. Furthermore, the cuffs are susceptible to packaging in individual sterile containers, and this feature likewise greatly increases the ease of handling of the cuffs.

It will be understood that various modifications can be made in the above described cuff constructions which provide the characteristics of this invention without departing from the spirit thereof particularly as defined in the following claims.

That which is claimed is:

1. In an endotracheal cuff for use in combination with an endotracheal tube wherein the cuff and tube are inserted into the trachea with the cuff surrounding the tube and wherein the cuff is adapted to be inflated to seal the passage between the external surface of the tube and the internal surface of the trachea, the improvement wherein said cuff is formed from a normally flat, rectangular dispensable envelope having long side edges and short side edges and formed of heat sealable material, the side edges of said envelope being heat sealed whereby the envelope is sealed in a fluid-tight manner about its edges, a relatively narrow band of pressure sensitive adhesive disposed immediately adjacent one of said short side edges and extending transversely to said long side edges on one outer surface thereof, said band having a width terminating along a line adjacent to and spaced from said short side edge, an opening defined in one of the long side edges of said envelope adjacent the other short side edge thereof, and an air conduit communicating with said opening, said conduit extending outwardly approximately at right angles from said long edge, whereby the long dimension of said envelope is adapted to be wrapped around said tube with said one surface being in engagement with the external surface of the tube and whereby said one short side edge of the envelope overlaps the opposite surface of the envelope with the adhesive on said one short side edge pressing into adhering engagement with said opposite surface for holding the envelope in position on the tube, said envelope being adapted to expand in all directions in response to introduction of air into the envelope through said conduit to provide said sealing relationship between the tube and the trachea.

2. An endotracheal cuff in accordance with claim 1 wherein said one short side edge of the envelope is tapered and whereby one of said long side edges of said envelope is shorter than the other long side edge, and wherein said other long side edge is disposed adjacent the distal end of said tube when the envelope is wrapped around the tube.

References Cited by the Examiner

UNITED STATES PATENTS

| | | | |
|---|---|---|---|
| 2,335,204 | 11/43 | Winder | 128—327 |
| 2,511,269 | 6/50 | Jones | 128—327 |
| 2,618,269 | 11/52 | Baum | 128—327 |
| 2,792,837 | 5/57 | Kardos | 128—351 |
| 2,883,986 | 4/59 | De Luca et al. | 128—351 |

OTHER REFERENCES

Sterm: "Modified Endotracheal Tube," from Anesthesiology, vol. 21, No. 6, November–December 1960, page 775.

RICHARD A. GAUDET, *Primary Examiner.*

JORDAN FRANKLIN, *Examiner.*